S. D. Locke,
Grain Binder.

No. 52722.   Patented Feb. 20, 1866.

Witnesses: W. Robinson, Lionel Young

S. D. Locke

UNITED STATES PATENT OFFICE.

SYLVANUS D. LOCKE, OF JANESVILLE, WISCONSIN.

IMPROVEMENT IN REELS FOR GRAIN-BINDERS.

*Specification forming part of Letters Patent No. 52,722, dated February 20, 1866.*

*To all whom it may concern:*

Be it known that I, SYLVANUS D. LOCKE, of the city of Janesville, county of Rock, and State of Wisconsin, have invented a new and useful machine known as an Extension-Reel for Grain-Binding Machines; and I do hereby declare that the following is a full, clear, and exact description of the construction and operation of the same, reference being had to the accompanying drawings, making a part of this specification, like characters referring to like parts in each figure.

The nature of my invention consists in making the reel of a grain-binding apparatus adjustable by means of compressible extensile arms, for the purpose of allowing a bundle of wire, or other binding material, as it comes from the manufacturer, to be placed without recoiling it upon the reel for use, thus saving the time, labor, and avoiding the imperfections incident to recoiling by hand.

To enable others skilled in the mechanic arts to construct and operate my machine, I will refer to the accompanying drawings, in which—

Figure 1:
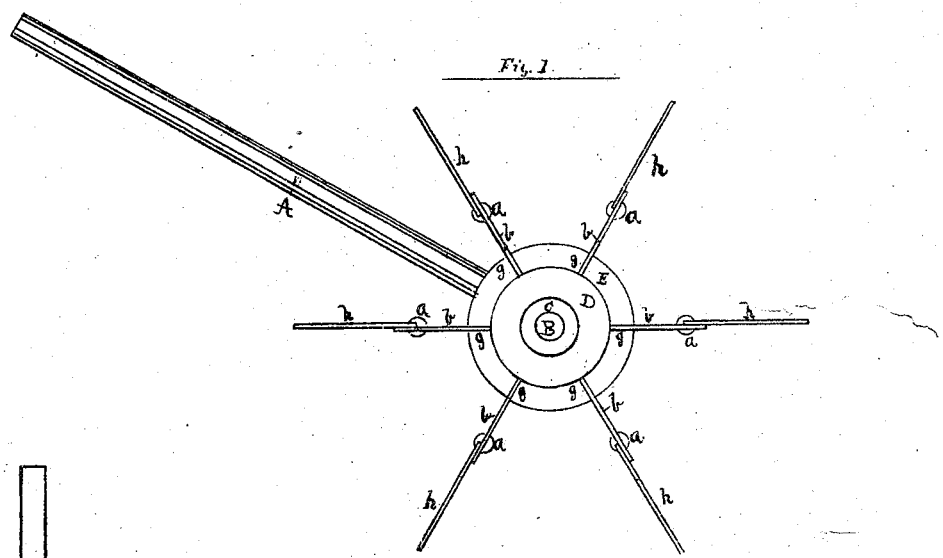
Figure 2:
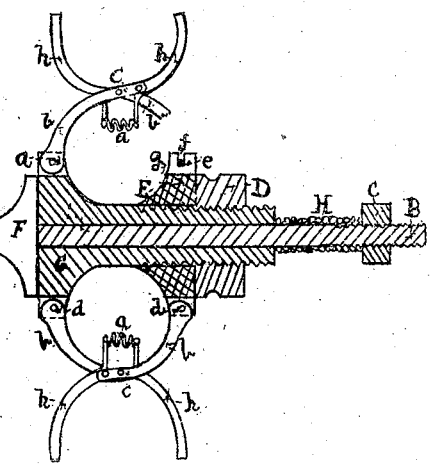

Figure 1 is a side or end view of the reel. Fig. 2 is a longitudinal section of Fig 1.

A, Figs. 1 and 2, is a standard for supporting the reel. B, Figs. 1 and 2, is an axis on which the reel revolves. C is a nut used to regulate the tension on the binding-wire by means of friction created at the point F, Fig. 2. By turning up the nut C the coiled spring H, Fig. 1, is contracted, thus forcing the end of the body of the reel G against the friction-head F. By turning back the nut C the friction is removed from the reel, in whole or in part, giving the operator complete control of the strain over the binding-wire. It will be seen that the lateral pressure against the reel, crowding or pressing it longitudinally to its shaft against a friction or bearing surface, as the friction-head F, may be induced by the nut C and a washer, or by the nut alone, and so dispense with the shaft-spring H. In this case the nut with the washer interposed, or the nut alone, will work directly upon the end of the body of the reel; but I prefer, in order to regulate and equalize the power of the nut, to interpose the shaft-spring, as above described. D is a regulating-nut, used to contract the diameter of the reel in one direction, while, at the same time, it increases it in the other. The movable end E of the reel is constructed so as to freely slide over the core of the reel G as the regulating-nut D is run up or back. *f*, Fig. 2, represents a channel or groove run around each head or end of the reel, in which the wire *e* runs, which secures the first section of the adjustable arms *b* to the heads. This wire *e* passes through the hole *d* in the arms, and makes a hinge-joint, on which they work in their adjustment by turning the nut D. *a* are coiled-wire springs, whose office is to keep the second section of the arms *b* (which section is marked *h* in the drawings) in proper position. The adjustable arms *b* are hinged together at *c*, Fig. 2, and are housed into the respective heads of the body of the reel, through transverse cuts *g*, occurring at regular distances on the periphery of the same, where they are secured by the wire *e* passing through the hole *d* in the arm, as hereinbefore described.

I call the arms *b* extensile, for when governed by the nut D they extend to, meet, and adjust themselves to the skein of twine or coil of wire which the operator desires to use. The office of the springs *a* is to retain the outer section of arms in position, and to allow them to adjust themselves to the coil of wire so as to press it equally underneath and at the sides.

When only twine or cord is used for binding, I prefer to dispense with the springs *a*, and attach the lower or inner ends of the second section of arms *h* together, as by pins; or, by extending the outer ends of the first section of arms so as to form a cradle for holding the twine, the second section may be entirely dispensed with. The regulating-nut D may be attached to the movable head E of the reel, so as to contract the periphery of the reel as the nut is run back.

To operate this reel it is only necessary to run back the regulating-nut D, when the reel will contract its major diameter or periphery sufficiently to receive over the ends of the arms the coil of wire or skein of twine that the operator desires to use; then, by turning up the regulating-nut D, the arms will extend and adjust themselves to the shape as well as the size of the coil or skein aforementioned.

The advantages of an extension or adjustable reel are apparent, enabling the farmer to take the binding material and put it directly, in the form it comes from the manufactory, upon the reel for use, so obviating the tedious process of coiling or winding it upon the reel by hand, as necessity has heretofore required.

What I claim as new, and for which I desire Letters Patent of the United States, is—

1. An adjustable reel, constructed with extensile arms, substantially as and for the purposes set forth.

2. The combination of nut D and movable head or end E with the adjustable arms $b$ and the body of reel G.

S. D. LOCKE.

Witnesses:
W. ROBINSON,
LEWIS HUNT.